(12) United States Patent
Heinrichs et al.

(10) Patent No.: US 8,378,007 B2
(45) Date of Patent: *Feb. 19, 2013

(54) COLOURED AQUEOUS POLYMER DISPERSIONS, AND PRODUCTION AND USE OF SAME

(75) Inventors: Franz-Leo Heinrichs, Gablingen (DE); Anais Bialy, Hofheim (DE); Klaus Saitmacher, Kriftel (DE); Josef Ritter, Bad Soden (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,512

(22) Filed: Mar. 16, 2012

(65) Prior Publication Data

US 2012/0171604 A1 Jul. 5, 2012

Related U.S. Application Data

(62) Division of application No. 12/374,950, filed as application No. PCT/EP2007/005820 on Jun. 30, 2007, now Pat. No. 8,163,818.

(30) Foreign Application Priority Data

Jul. 25, 2006 (DE) .................. 10 2006 034 239

(51) Int. Cl.
- *C08L 83/00* (2006.01)
- *C08K 5/00* (2006.01)
- *C08K 5/49* (2006.01)
- *C08K 5/01* (2006.01)
- *C08F 2/26* (2006.01)
- *C08B 14/00* (2006.01)

(52) U.S. Cl. ........ 523/201; 524/123; 524/155; 524/710; 524/745; 524/773; 428/511; 106/400

(58) Field of Classification Search ............ 523/201; 524/123, 155, 710, 745, 773; 106/400
See application file for complete search history.

(56) References Cited

U.S. PATENT DOCUMENTS

| | | | |
|---|---|---|---|
| 5,298,355 A | 3/1994 | Tyagi et al. | |
| 5,401,780 A | 3/1995 | Bugnon et al. | |
| 6,485,558 B1 | 11/2002 | Metz et al. | |
| 7,524,892 B2 | 4/2009 | Kataoka et al. | |
| 2002/0098435 A1 | 7/2002 | Rohr et al. | |
| 2005/0228069 A1 | 10/2005 | Kataoka et al. | |
| 2006/0000392 A1* | 1/2006 | Reisacher et al. | 106/499 |
| 2006/0048675 A1* | 3/2006 | Krusemann et al. | 106/401 |
| 2010/0021701 A1 | 1/2010 | Heinrichs | |
| 2010/0047531 A1 | 2/2010 | Baum et al. | |

FOREIGN PATENT DOCUMENTS

| | | |
|---|---|---|
| EP | 1035178 | 9/2000 |
| EP | 1081195 | 3/2001 |
| EP | 1164721 | 1/2006 |
| WO | WO 2004/035276 | 4/2004 |
| WO | WO 2004/046251 | 6/2004 |
| WO | WO 2006/066809 | 6/2006 |

OTHER PUBLICATIONS

U.S.P.T.O. Office Action for U.S. Appl. No. 12/374,958, mailed Sep. 15, 2011.
U.S.P.T.O. Office Action for U.S. Appl. No. 12/374,958, mailed Jan. 10, 2011.
PCT International Search Report for PCT EP/2007/005820, mailed Mar. 6, 2008.
English Translation of the PCT International Preliminary Report on Patentability for PCT/EP2007/005820, mailed Feb. 26, 2009.
English Abstract of JP 2000239392, Sep. 5, 2000.

* cited by examiner

*Primary Examiner* — Michael M Bernshteyn
(74) *Attorney, Agent, or Firm* — Anthony A. Bisulca

(57) ABSTRACT

The invention relates to a colored polymer dispersion containing, as main ingredients: (a) a colored polymer produced by polymerization of monomer A with monomer B, monomer A being a pigment B which is coated with a polymerizable wax D wherein the polymerizable function is an ethylenically unsaturated group, monomer B being a ethylenically unsaturated compound; (b) at least one non-ionic surface-active additive E based on polyethers and/or polyglycerines; (c) at least one anionic surface-active additive F based on sulfonates, sulfates, phosphonates, phosphates or carboxylates; and (d) water.

3 Claims, No Drawings

COLOURED AQUEOUS POLYMER DISPERSIONS, AND PRODUCTION AND USE OF SAME

CROSS REFERENCE TO RELATED APPLICATION

This Application is a Divisional Application of co-pending U.S. Application Ser. No. 12/374,950 filed Jan. 23 2009, the entire disclosure of which is hereby incorporated herein by reference.

Polymer dispersions are employed in numerous applications. For the purpose of coloring it is possible to use not only dyes but also pigments. On account of their higher light stability and weather resistance, pigments are preferred in aqueous applications. In pigmented systems, however, problems are presented in particular by the stability of the preparation and the fixing on the substrate or in the binder; likewise, the color effect and the gloss are not always satisfactory. In order to counter these problems it is prior art to provide pigments with polar coatings or to stabilize them through additions.

For instance, JP 1999 00 040 329 describes the addition of a self-emulsifying resin in a water-compatible solvent. In the course of this treatment a polymer film forms on the pigment surface that simplifies the dispersing of the pigment in aqueous systems.

JP 2000 239 392 describes the use of polyurethane/acrylate dispersions. The addition of such polymer dispersions to a pigment dispersion likewise leads to a polar coating. The pigments are stable in water and solvent and exhibit good storage stability. Products of this kind are recommended for use in coatings or inks.

In EP-A-1 614 721, pigments are treated with a polymer made from hydrophobic and hydrophilic monomers and compounds containing urethane groups.

EP-A-1 035 178 describes a chemical surface treatment for improving storage stability, where the surface of particles of carbon black is made more polar, by means of oxidation, so that they can be used in ink-jet inks.

Stable dispersions can also be generated through the addition of surface-active components.

In the case of the processes set out to date, stability and adhesion are optimized, but there is virtually no improvement in gloss.

Wax coatings are also known for pigments, as in U.S. Pat. No. 5,298,355, for example.

Applied from water, however, preparations of this kind do not produce resistant films. The problem is to find the right balance. Surface-active substances improve the stability but reduce the water resistance of the applied material; additions of polymer improve the dispersibility and adhesion, but may be disadvantageous with respect to color and gloss; waxes give the desired gloss, but are difficult to apply from water.

The problem posed is therefore that of preparing colored, film-forming polymer dispersions which are storage-stable and produce good adhesion, gloss, color action and weathering resistance.

It has been found that the polymer dispersion below surprisingly solves this problem.

The invention provides a colored polymer dispersion comprising as essential constituents (a) a color polymer prepared by polymerizing monomer A with monomer B, monomer A being a pigment P which is coated with a polymerizable wax D in which the polymerizable function is an ethylenically unsaturated group, and monomer B being an ethylenically unsaturated compound;

(b) at least one nonionic surface-active additive E based on polyethers and/or polyglycerols;

(c) at least one anionic surface-active additive F based on sulfonates, sulfates, phosphonates, phosphates or carboxylates;

(d) water.

Preference is given to polymer dispersions characterized by

2% to 60%, preferably 5% to 45%, more particularly 8% to 35%, by weight of component (a), 0.1% to 15%, preferably 0.1% to 12%, more particularly 0.5% to 5%, by weight of component (b), 0.1% to 15%, preferably 0.1% to 10%, more particularly 0.5% to 2%, by weight of component (c), 10% to 90%, preferably 10% to 70%, more particularly 10% to 60%, by weight of water (d), 0% to 20%, preferably 0.01% to 10%, more particularly 0.1% to 5%, by weight of typical auxiliaries (e), the sum of the weight percentages not exceeding 100% by weight.

In the polymer dispersion of the invention the pigment P may be an organic chromatic pigment, an inorganic chromatic pigment, a white pigment, a carbon black pigment or a combination of two or more pigments.

The organic chromatic pigment may preferably be an azo pigment, an anthanthrone pigment, an anthrapyrimidine pigment, a quinacridone pigment, a quinophthalone pigment, a diketopyrrolopyrrole pigment, a dioxazine pigment, an indanthrone pigment, an isoindoline pigment, an isoindolinone pigment, an isoviolanthrone pigment, a perylene pigment, a perinone pigment, a phthalocyanine pigment, a pyranthrone pigment, a pyrazoloquinazolone pigment, a thioindigo pigment, a triarylcarbonium pigment or a combination thereof.

Examples of pigments P are as follows:

azo pigments:
C.I. Pigment Yellow 12, 13, 14, 16, 17, 26, 74, 81, 83, 97, 106, 113, 120, 127, 151, 155, 174, 176, 180, 188, 213, 214;
disazo pigments:
C.I. Pigment Orange 16, 34, 44, 72, 108;
disazo condensation pigments:
C.I. Pigment Red 144, 166, 214, 220, 221, 242, 262;
C.I. Pigment Yellow 93, 95, and 128;
C.I. Pigment Brown 23 and 41;
anthanthrone pigments:
C.I. Pigment Red 168;
anthraquinone pigments:
C.I. Pigment Yellow 147, 177, and 199;
C.I. Pigment Violet 31;
anthrapyrimidine pigments:
C.I. Pigment Yellow 108;
quinacridone pigments:
C.I. Pigment Orange 48 and 49;
C.I. Pigment Red 122, 202, 206, and 209;
C.I. Pigment Violet 19;
quinophthalone pigments:
C.I. Pigment Yellow 138;
diketopyrrolopyrrole pigments:
C.I. Pigment Orange 71, 73, and 81;
C.I. Pigment Red 254, 255, 264, 270, and 272;
dioxazine pigments:
C.I. Pigment Violet 23 and 37;
C.I. Pigment Blue 80;
flavanthrone pigments:
C.I. Pigment Yellow 24;
indanthrone pigments: C.I. Pigment Blue 60 and 64;
isoindoline pigments: C.I. Pigment Orange 61 and 69;

C.I. Pigment Red 260;
C.I. Pigment Yellow 139 and 185;
isoindolinone pigments: C.I. Pigment Yellow 109, 110, and 173;
isoviolanthrone pigments: C.I. Pigment Violet 31;
metal complex pigments: C.I. Pigment Red 257;
C.I. Pigment Yellow 117, 129, 150, 133, and 177;
C.I. Pigment Green 8;
perinone pigments: C.I. Pigment Orange 43;
C.I. Pigment Red 194;
perylene pigments: C.I. Pigment Black 31 and 32;
C.I. Pigment Red 123, 149, 178, 179, 190, and 224;
C.I. Pigment Violet 29;
phthalocyanine pigments: C.I. Pigment Blue 15, 15:1, 15:2, 15:3, 15:4, 15:6, and 16;
C.I. Pigment Green 7 and 36;
pyranthrone pigments: C.I. Pigment Orange 51;
C.I. Pigment Red 216;
pyrazoloquinazolone pigments:
C.I. Pigment Orange 67;
C.I. Pigment Red 251;
thioindigo pigments: C.I. Pigment Red 88 and 181;
C.I. Pigment Violet 38;
triarylcarbonium pigments:
C.I. Pigment Blue 1, 61, and 62;
C.I. Pigment Green 1;
C.I. Pigment Red 81, 81:1, and 169;
C.I. Pigment Violet 1, 2, 3, and 27;
C.I. Pigment Black 1 (aniline black);
C.I. Pigment Yellow 101 (aldazine yellow);
C.I. Pigment Brown 22.

Examples of suitable inorganic color pigments include the following:
white pigments: titanium dioxide (C.I. Pigment White 6), zinc white, pigmentary zinc oxide; zinc sulfide,
lithopones;
black pigments: black iron oxide (C.I. Pigment Black 11), iron manganese black, spinel black (C.I. Pigment Black 27); carbon black (CA. Pigment Black 7);
chromatic pigments:
chromium oxide, chromium oxide hydrate green; chromium green (C.1. Pigment Green 48); cobalt green (C.I. Pigment Green 50);
ultramarine green; cobalt blue (C.I. Pigment Blue 28 and 36; C.I. Pigment Blue 72); ultramarine blue; manganese blue;
ultramarine violet; cobalt and manganese violet; red iron oxide (C.I. Pigment Red 101);
cadmium sulfoselenide (C.I. Pigment Red 108); cerium sulfide (C.I. Pigment Red 265); molybdate red (C.I. Pigment Red 104); ultramarine red
brown iron oxide (C.I. Pigment Brown 6 and 7), mixed brown, spinel phases and corundum phases (C.I. Pigment Brown 29, 31, 33, 34, 35, 37, 39, and 40), chrome titanium yellow (C.I. Pigment Brown 24),
chrome orange; cerium sulfide (C.I. Pigment Orange 75);
yellow iron oxide (C.I. Pigment Yellow 42); nickel titanium yellow (C.I. Pigment Yellow 53; C.I. Pigment Yellow 157, 158, 159, 160,161, 162, 163, 164, and 189);
chrome titanium yellow; spinel phases (C.I. Pigment Yellow 119); cadmium sulfide and cadmium zinc sulfide (C.I. Pigment Yellow 37 and 35); chromium yellow (C.I. Pigment Yellow 34); bismuth vanadate (C.I. Pigment Yellow 184).
cerium sulfide (C.I. Pigment Red 265);
molybdate red (C.I. Pigment Red 104); ultramarine red.

Particular preference is given as pigment P to a yellow, cyan, magenta or black pigment.

Examples of inorganic pigments used typically as fillers include transparent silicon dioxide, finely ground quartz, aluminum oxide, aluminum hydroxide, natural micas, natural and precipitated chalk, and barium sulfate.

Also suitable are luster pigments, which are platelet-shaped pigments of single-phase or multi-phase construction whose color play is characterized by the interplay of interference, reflection, and absorption phenomena. Examples include aluminum flakes and also aluminum, iron oxide, and mica flakes that are coated one or more times, more particularly with metal oxides.

The average particle size $d_{50}$ of the pigments P is preferably situated at a value between 50 and 500 nm, more particularly between 70 nm and 200 nm, more preferably between 70 and 150 nm.

The polymerizable wax D is preferably a reaction product of a polyol, long-chain aliphatic carboxylic acids, and at least one ethylenically unsaturated carboxylic acid, and may have been oligomerized by the addition of a dicarboxylic acid. Long-chain aliphatic carboxylic acids which can be used include all carboxylic acids having more than 7 carbon atoms, but preferably $C_8$-$C_{22}$ fatty acids and $C_{22}$-$C_{50}$ wax acids, either in pure form or else, preferably, in the form of mixtures of technical products such as, for example, coconut fatty acid, tallow fatty acid, sunflower acid, montan wax acid, paraffin oxidate or olefin oxidate. The composition of the mixture of acids is usually such that the melting point of the mixture is above 50° C. For molecular weight enlargement, the mixtures of the long-chain carboxylic acids may also have been admixed with small fractions of dicarboxylic acids such as adipic acid, dodecanedioic acid, and montan wax dicarboxylic acids.

Polyols which can be used include polyhydric aliphatic alcohols having 2 to 10 carbon atoms and 2 to 10 OH groups, such as glycols, glycerol, trimethylolpropane, glycerol, pentaerythritol, sugar alcohols, sorbitol, and their internal ethers such as sorbitans, their oligomers such as diglycerol, dipentaerythritol, their polymers such as polyglycols or polyglycerols, or the alkoxylates of the stated polyols.

As ethylenically unsaturated carboxylic acids it is possible for example to use acrylic acid, methacrylic acid, maleic acid, fumaric acid or itaconic acid, and also their anhydrides or esters. The stoichiometry is chosen such that one mole of polyol fatty acid partial ester is reacted with one mole of the unsaturated carboxylic acid.

The polymerizable wax D may be illustrated by way of example using the reaction product of pentaerythritol, a mixture of long-chain aliphatic carboxylic acids, based on technical montan wax acid, and acrylic acid:

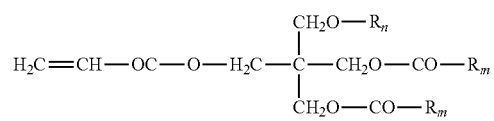

$R_n$=H, CO—$R_m$, $R_m$=alkyl radical of the montan wax acid

The polymerizable wax D can be prepared by reacting the polyol with the long-chain aliphatic carboxylic acid to give a partial ester, which can then be further reacted to a polyester wax by esterification with a dicarboxylic acid. An ethylenically unsaturated acid is then attached to this partial ester component via esterification, giving a solid reactive product having a melting point between 40 and 90° C. Reactive compounds of this kind are known and are available commercially, for example, under the name ®Licomont ER 165 (Clariant).

Used as monomer B are compounds which are able to react with the ethylenically unsaturated functional group of the coating component D. Particularly suitable compounds in this group are acrylic acid, methacrylic acid, esters of acrylic acid, especially methyl acrylate, ethyl acrylate, butyl acrylate, 2-ethylhexyl acrylate, hydroxyalkyl acrylates, acrylates of polyols, esters of methacrylic acid, especially methyl methacrylate, and hydroxyalkyl esters, and polyol esters. Use is also made of styrene, alkylstyrenes, and divinylbenzenes.

The polymer a) of the invention is composed essentially of 5% to 95%, preferably 20% to 70%, more particularly 30% to 60%, by weight, of pigment P, of 2.5% to 50%, preferably 5% to 40%, more particularly 10% to 30%, by weight, of the wax D reacted with monomer B, and of 2.5% to 50%, preferably 5% to 40%, more particularly 10% to 30%, by weight of the monomer B reacted with D.

As additive E the polymer dispersions of the invention comprise at least one nonionic surface-active additive based on polyethers or polyglycerols. The polyethers are, more particularly, polyalkylene oxides or reaction products of alkylene oxides with alcohols, amines, aliphatic carboxylic acids or aliphatic carboxamides. In accordance with the invention, this term "alkylene oxide" should also be understood to include aryl-substituted alkylene oxide, more particularly phenyl-substituted ethylene oxide. Besides the unmixed polyalkylene oxides, preferably $C_2$-$C_4$ alkylene oxides and phenyl-substituted $C_2$-$C_4$ alkylene oxides, more particularly polyethylene oxides, polypropylene oxides, and poly(phenylethylene oxides), suitability is possessed principally by alkylene oxide block copolymers, but also by random copolymers of these alkylene oxides. Especially suitable in this context are block copolymers which contain polypropylene oxide and polyethylene oxide blocks or else poly(phenylethylene oxide) and polyethylene oxide blocks. Like the unmixed polyalkylene oxides, they can be obtained by polyaddition of the alkylene oxides with starter compounds such as saturated or unsaturated aliphatic and aromatic alcohols, saturated or unsaturated aliphatic and aliphatic amines, saturated or unsaturated aliphatic carboxylic acids and carboxamides. When using ethylene oxide and propylene oxide, these starter compounds can be reacted first with ethylene oxide and then with propylene oxide, or first with propylene oxide and then with ethylene oxide. Typically 1 to 300 mol, preferably 3 to 150 mol, of alkylene oxide are used per mole of starter molecule. Suitable aliphatic alcohols in this context contain generally 6 to 26 C atoms, preferably 8 to 18 C atoms, and may be unbranched, branched or cyclic in construction. Examples include octanol, nonanol, decanol, isodecanol, undecanol, dodecanol, 2-butyloctanol, tridecanol, isotridecanol, tetradecanol, pentadecanol, hexadecanol, 2-hexyldecanol, heptadecanol, octadecanol, 2-heptylundecanol, 2-octyldecanol, 2-nonyltridecanol, 2-decyltetradecanol, oleyl alcohol, and 9-octadecenol, and also mixtures of these alcohols such as $C_{12}/C_{10}$, $C_{13}/C_{15}$ and $C_{16}/C_{18}$ alcohols, and cyclopentanol and cyclohexanol. Of particular interest are the saturated and unsaturated fatty alcohols which are obtained by fat cleavage and reduction from natural raw materials, and the synthetic fatty alcohols from the oxo process. The alkylene oxide adducts of these alcohols typically have average molecular weights Mn of 200 to 5000, principally of 400 to 2000.

Examples of the abovementioned aromatic alcohols, as well as alpha- and β-naphthol and their alkyl derivatives, include, in particular, phenol and its alkyl derivatives, such as hexylphenol, heptylphenol, octylphenol, nonylphenol, isononylphenol, undecylphenol, dodecylphenol, di- and tributylphenol, and dinonylphenol.

Suitable aliphatic amines correspond to the aliphatic alcohols set out above. Here again, particular importance is possessed by the saturated and unsaturated fatty amines which contain preferably 14 to 20 C atoms. Examples of aromatic amines include aniline and its derivatives. Suitable aliphatic carboxylic acids are, in particular, saturated and unsaturated fatty acids which contain preferably 14 to 20 C atoms, and hydrogenated, part-hydrogenated and unhydrogenated resin acids, and also polyfunctional carboxylic acids, examples being dicarboxylic acids, such as maleic acid.

Suitable carboxamides derived from these carboxylic acids.

Besides the alkylene oxide adducts of these monofunctional amines and alcohols, the alkylene oxide adducts of at least difunctional amines and alcohols are of very particular interest.

Preferred at least difunctional amines are amines with a functionality of two to five which conform in particular to the formula $H_2N$—$(R$—$NR^1)n$-$H$ (R: alkylene; $R^1$: hydrogen or $C_1$-$C_6$ alkyl; n: 1 to 5). Specific examples that may be mentioned include the following: ethylenediamine, diethylenetriamine, triethylenetetramine, tetraethylenepentamine, propylene-1,3-diamine, dipropylenetriamine, 3-amino-1-ethylenaminopropane, hexamethylenediamine, dihexamethylenetriamine, 1,6-bis(3-aminopropylamino) hexane, and N-methyldipropylenetriamine, particular preference being given to hexamethylenediamine and diethylenetriamine, and very particular preference to ethylenediamine. These amines are preferably reacted first with propylene oxide and then with ethylene oxide. The ethylene oxide content of the block copolymers is typically about 10% to 90% by weight. The block copolymers based on polyfunctional amines generally have average molecular weights Mn of 1000 to 40 000, preferably 1500 to 30 000.

Preferred at least difunctional alcohols are alcohols having a functionality of two to five. Examples include $C_2$-$C_3$ alkylene glycols and the corresponding di- and polyalkylene glycols, such as ethylene glycol, propylene 1,2- and 1,3-glycol, butylene 1,2- and 1,4-glycol, hexylene 1,6-glycol, dipropylene glycol and polyethylene glycol, glycerol and pentaerythritol, particular preference being given to ethylene glycol and polyethylene glycol, and very particular preference to propylene glycol and dipropylene glycol.

Particularly preferred alkylene oxide adducts of at least difunctional alcohols have a central polypropylene oxide block, in other words start from a propylene glycol or polypropylene glycol, which is reacted first with further propylene oxide and then with ethylene oxide. The ethylene oxide content of the block copolymers is typically 10% to 90% by weight.

The block copolymers based on polyhydric alcohols generally have average molecular weights Mn of 1000 to 20 000, preferably 1000 to 15 000.

Alkylene oxide block copolymers of this kind are known and are available commercially, for example, under the names Tetronic® and Pluronic® (BASF). Alkylene oxide block copolymers with different HLB (hydrophilic-lipophilic balance) values are selected as a function of the application medium in which the pigment preparations of the invention are to be used.

Thus, for use in aqueous, aqueous/alcoholic, and alcoholic systems, alkylene oxide block copolymers with HLB values of approximately 10 are preferred, corresponding to an ethylene oxide fraction in the copolymer of generally 25% by weight.

The polyglycerols are, more particularly, glycerides of fatty acids, such as polyglycerol polyricinoleate.

As additive F the polymer dispersions of the invention comprise at least one anionic surface-active additive based on sulfonates, sulfates, carboxylates, phosphonates or phosphates. Examples of suitable sulfonates are aromatic sulfonates, such as p-$C_3$-$C_9$-alkylbenzenesulfonates, di($C_1$-$C_8$-alkyl)naphthalenesulfonates, and condensation products of naphthalenesulfonic acids with formaldehyde, and aliphatic sulfonates, such as $C_{13}$-$C_{18}$ alkanesulfonates, alpha-sulfo-fatty acid $C_2$-$C_8$ alkyl esters, sulfosuccinic esters, and alkoxy-, acyloxy-, and acylaminoalkane-sulfonates.

Alkylsulfonates are preferred, the di($C_1$-$C_8$-alkyl)naphthalenesulfonates being particularly preferred. Very particular preference is given to diisobutyl- and diisopropylnaphthalene-sulfonate. Examples of suitable sulfates are $C_8$-$C_{11}$ alkyl sulfates.

A further important group of anionic additives is formed by the sulfonates, sulfates, phosphonates, and phosphates of the polyethers specified as nonionic additives. They can be converted, by reaction with phosphoric acid, phosphorous pentoxide, and phosphonic acid, or sulfuric acid and sulfonic acid, into the phosphoric monoesters or diesters and phosphonic esters, or into the sulfuric monoesters and sulfonic esters. Like the sulfonates and sulfates listed earlier on above, these acidic esters are preferably in the form of water-soluble salts, more particularly alkali metal salts, principally sodium salts and ammonium salts, but can also be used in the form of the free acids.

Preferred phosphates and phosphonates derive principally from alkoxylated, more particularly ethoxylated, fatty alcohols and oxo-process alcohols, alkylphenols, stearylphenols, fatty amines, fatty acids, and resin acids; preferred sulfates and sulfonates are based more particularly on alkoxylated, especially ethoxylated, fatty alcohols, alkylphenols, and amines, including polyfunctional amines, such as hexamethylenediamine.

Anionic surface-active additives of this kind are known and are available commercially, for example, under the names Nekal® (BASF), Tamol® (BASF), Crodafos® (Croda), Rhodafac® (Rhodia), Maphos® (BASF), Texapon® (Cognis), Empicol® (Albright & Wilson), Matexil® (ICI), Sopropor® (Rhodia), Lutensit® (BASF), and Dispersogen (Clariant).

Examples of typical auxiliaries (e) are preservatives, pH regulators, thickeners, retention agents, and defoamers.

A variety of processes can be used for preparing the polymer dispersions of the invention:

Process 1 comprises subjecting the pigment P in aqueous suspension to fine division with at least one part of the components b) and c), under the action of shearing forces, homogenizing the thus prepared pigment dispersion with the polymerizable wax D, optionally a part of monomer B, and optionally with addition of further component b) and/or c) at a temperature above the softening point of D, adding a mixture of water, monomer B, and optionally further component c) and/or d) to the coated pigment dispersion thus prepared, and carrying out polymerization.

For the polymerization a typical polymerization initiator is optionally added, the mixture is brought to a temperature between 70 and 90° C., and, optionally, further monomer B is metered in.

Process 2 comprises preparing a miniemulsion from the melted polymerizable wax D and components b) and c), then subjecting said miniemulsion, together with an aqueous suspension of the pigment P, to fine division, under the action of shearing forces, adding a mixture of water, monomer B, and optionally further component b) and/or c) to the coated pigment dispersion thus prepared, and carrying out polymerization.

For the polymerization a typical polymerization initiator is optionally added, the mixture is brought to a temperature between 70 and 90° C., and, optionally, further monomer B is metered in.

In one preferred embodiment of process 1, the pigment is first subjected in aqueous suspension to wet comminution with at least one part of the additive E and F. The pigment dispersion thus prepared is dispersed with liquid wax D, optionally a portion of monomer B, and further additives E and F at temperatures above the melting point of the wax. For the dispersing it is possible to use open vessels with simple stirring assemblies, though it is also possible to use dispersers of the kind known from paint production, high-pressure homogenizers or other pressure mixing chamber methods (vortex). In the course of this treatment the liquid wax goes onto the pigment, and the coated particles are stabilized by the additives E and F. The result is a coated pigment dispersion.

A polymerization reactor is charged with water and emulsifiers from the group of additives F, and a portion of the monomers B, and this initial charge is heated to about 70 to 80° C., then an initiator is added, and the mixture is heated to 75 to 90° C. After the start of the reaction, remaining monomer B is metered in. The coated pigment dispersion indicated above is then metered into the reaction mixture. Following the addition, further monomer B may be metered in. After the reaction the product is cooled, the pH is adjusted to neutral, and preservative is added.

In one preferred embodiment of process 2, a miniemulsion is first prepared from the melted wax D and additives of groups E and F, and after cooling this miniemulsion is then admixed with further additives E and F and is subjected to a wet comminution together with an aqueous suspension of the pigment. In the case of this process, the wax is applied to the pigment particles by grinding. The result is a coated pigment dispersion.

A polymerization reactor is charged with water and emulsifiers from the group of additives F, and a portion of the monomers B, and this initial charge is heated to about 70 to 80° C., then an initiator is added, and the mixture is heated to 75 to 90° C. After the start of the reaction, remaining monomer B is metered in. The coated pigment dispersion indicated above is then metered into the reaction mixture. Following the addition, further monomer B may be metered in. After the reaction the product is cooled, the pH is adjusted to neutral, and preservative is added.

Initiators used are organic or inorganic free-radical initiators. Preference is given to using water-soluble inorganic initiators such as ammonium peroxodisulfate or sodium peroxodisulfate, though organic initiators such as AIBN or organic peroxides are likewise suitable.

In the case of peroxodisulfate initiators, a temperature of about 80° C. is optimal for the reaction; in the case of organic peroxides, the temperature is adapted to the optimum of the initiator.

Both processes result in a polymer dispersion in which the pigment particles are incorporated chemically into the polymer via the readily adhering, solid wax layer, and in which the particles are stabilized by the additives E and F.

Polymer dispersions thus prepared are highly compatible with the typical water-based coating materials or inks. They can therefore be added as a coloring component at high pigment levels. Alternatively, depending on the formulated film-forming temperature of the polymer mixture, they can be used directly to form coatings or, in dilution with water and auxiliaries, can be used as inks in various printing processes.

The invention therefore also provides for the use of the polymer dispersion of the invention for coloring aqueous coating materials, varnishes, emulsion paints, printing inks and liquid inks, more particularly ink-jet inks, preferably for coloring paper, wood, and leather.

From the dispersions of the invention it is also possible, by removing the solvent and carrying out drying, spray drying for example, to produce colored polymer particles.

The invention accordingly also provides colored polymer particles composed _ 30 essentially of 5% to 95% by weight of pigment and of a polymerized coating prepared by polymerizing 2.5% to 50% by weight of a polymerizable wax D, in which the polymerizable function is an ethylenically unsaturated group, with 2.5% to 50% by weight of a monomer B having a functional group which is able to react with the ethylenically unsaturated group of D, the weight percentages being based in each case on the total weight of the coated pigment particles, and the sum of the weight percentages not exceeding 100% by weight, the polymerizable wax D being a reaction product of a polyol, long-chain aliphatic carboxylic acids, and at least one ethylenically unsaturated carboxylic acid, and having possibly been oligomerized by the addition of a dicarboxylic acid.

Depending on the nature of the working up and drying, there may also still be 0% to 20% by weight of the nonionic additives b) and/or of the anionic additives c) and also further customary auxiliaries, such as preservatives, present on the colored polymer particles.

The polymer particles of the invention are used as colorants more particularly in powder coating materials, UV-curing varnishes, electrophotographic toners and developers, in ink-jet inks, more particularly those with an aqueous or nonaqueous basis, in microemulsion inks and in hot-melt ink-jet inks.

Microemulsion inks are based on organic solvents, water, and, if desired, an additional hydrotropic substance (interface mediator).

Microemulsion inks contain generally 0.5% to 30% by weight, preferably 1% to 15% by weight, of the polymer particles of the invention, 5% to 99% by weight of water, and 0.5% to 94.5% by weight of organic solvent and/or hydrotropic compound.

"Solvent based" ink-jet inks contain preferably 0.5% to 30% by weight of the polymer particles of the invention, 85% to 99.5% by weight of organic solvent and/or hydrotropic compounds.

Hot-melt inks are based mostly on waxes, fatty acids, fatty alcohols or sulfonamides which are solid at room temperature and become liquid on heating, the preferred melting range being between about 60° C. and about 140° C. Hot-melt ink-jet inks are composed, for example, essentially of 20% to 90% by weight of wax and 1% to 10% by weight of the polymer particles of the invention. Additionally present may be 0% to 20% by weight of an additional polymer, up to 5% by weight of dispersing assistants, 0% to 20% by weight of viscosity modifiers, 0% to 20% by weight of plasticizers, 0% to 10% by weight of tack additive, 0% to 10% by weight of transparency stabilizer (prevents, for example, crystallization of the waxes) and 0% to 2% by weight of antioxidant.

In the ink-jet inks the polymer particles of the invention may also be shaded with other colorants such as, for example, organic or inorganic pigments and/or dyes. In this case they are used in ink sets, consisting of yellow, magenta, cyan, and black inks, comprising pigments and/or dyes as colorants. Additionally they can be used in ink sets which further comprise one or more "spot colors" in, for example, orange, green, blue, gold and silver colors.

Preference is given in this context to a set of printing inks whose black formulation comprises preferably carbon black as colorant, more particularly a gas black or furnace black; whose cyan formulation comprises preferably a pigment from the group of the phthalocyanine, indanthrone or triarylcarbonium pigments, more particularly the Colour Index pigments Pigment Blue 15, Pigment Blue 15:1, Pigment Blue 15:2, Pigment Blue 15:3, Pigment Blue 15:4, Pigment Blue 16, Pigment Blue 56, Pigment Blue 60 or Pigment Blue 61; whose magenta formulation comprises preferably a pigment from the group of monoazo, disazo, naphthol, naphthol AS, laked azo, metal complex, benzimidazolone, anthanthrone, anthraquinone, quinacridone, dioxazine, perylene, thioindigo, triarylcarbonium or diketopyrrolopyrrole pigments, more particularly the Colour Index pigments Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 255, Pigment Red 256, Pigment Red 257, Pigment Red 262, Pigment Red 263, Pigment Red 264, Pigment Red 266, Pigment Red 269, Pigment Red 270, Pigment Red 272, Pigment Red 274, Pigment Violet 19, Pigment Violet 23 or Pigment Violet 32; whose yellow formulation comprises preferably a pigment from the group of the monoazo, disazo, benzimidazoline, isoindolinone, isoindoline or perinone pigments, more particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213 or Pigment Yellow 219; whose orange formulation comprises preferably a pigment from the group of the disazo, β-naphthol, naphthol AS, benzimidazolone or perinone pigments, more particularly the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 71, Pigment Orange 72, Pigment Orange 73, Pigment Orange 74 or Pigment Orange 81; and whose green preparation comprises preferably a pigment from the group of the phthalocyanine pigments, more particularly the Colour Index pigments Pigment Green 7 or Pigment Green 36.

In addition it is possible for the ink sets further to comprise shading dyes, preferably from the group of C.I. Acid Yellow 17 and C.I. Acid Yellow 23; C.I. Direct Yellow 86, C.I. Direct Yellow 98, and C.I. Direct Yellow 132; C.I. Reactive Yellow 37; C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155 and C.I. Pigment Yellow 180; C.I. Direct Red 1, C.I. Direct Red 11, C.I. Direct Red 37, C.I. Direct Red 62, C.I. Direct Red 75, C.I. Direct Red 81, C.I. Direct Red 87, C.I. Direct Red 89, C.I. Direct Red 95 and C.I. Direct Red 227; CA. Acid Red 1, C.I. Acid Red 8, C.I. Acid Red 80, C.I. Acid Red 81, C.I. Acid Red 82, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186, C.I. Acid Red 245, C.I. Acid Red 249 and C.I. Acid Red 289; C.I. Reactive Red 21, C.I. Reactive Red 22, C.I. Reactive Red 23, C.I. Reactive Red 35, C.I. Reactive Red 63, C.I. Reactive Red 106, C.I. Reactive Red 107, C.I. Reactive Red 112, C.I. Reactive Red 113, C.I. Reactive Red 114, C.I. Reactive Red 126, C.I. Reactive Red 127, C.I. Reactive Red 128, C.I. Reactive Red 129, C.I. Reactive Red 130, C.I. Reactive Red 131, C.I. Reactive Red 137, C.I. Reactive Red 160, C.I. Reactive Red 161, C.I. Reactive Red 174, and C.I. Reactive Red 180.

The polymer particles of the invention are suitable for producing inks for use in all conventional ink-jet printers, more particularly for those which are based on the bubble-jet or piezo process.

The polymer particles of the invention are also suitable for use as colorants in electrophotographic toners and developers, such as one- or two-component powder toners (also called one- or two-component developers), magnetic toners, liquid toners, polymerization toners, and specialty toners, for example. Typical toner binders are addition-polymerization resins, polyaddition resins, and polycondensation resins, such as styrene, styrene acrylate, styrene butadiene, acrylate, polyester, and phenol-epoxy resins, polysulfones, polyurethanes, individually or in combination, and also polyethylene and polypropylene, which may also have further ingredients, such as charge control agents, waxes or flow assistants, present in them or added subsequently to them for modification.

The polymer particles of the invention are additionally suitable for use as colorants in powders and powder coating materials, more particularly in triboelectrically or electrokinetically sprayable powder coating materials which are employed for the surface coating of articles made, for example, from metal, wood, plastic, glass, ceramic, concrete, leather, textile material, paper or rubber.

General procedure for Examples 1 to 10 (process 1):

(a) Preparation of a Pigment Dispersion:

The pigment, in the form either of a powder or a filter cake, is pasted in deionized water together with the dispersants, the organic solvent, and the other additions, and then the paste is homogenized and predispersed using a dissolver or other suitable apparatus. The subsequent fine dispersion takes place by means of a bead mill (e.g., with a MiniZETA 03 from Netzsch) or other suitable dispersing assembly, with grinding taking place accompanied by cooling and proceeding until the desired size distribution of the pigment particles is obtained. Thereafter the dispersion is adjusted with deionized water to the desired final pigment concentration.

(b) Preparation of a Wax-coated Pigment Dispersion:

Polymerizable wax D (e.g. ®Licomont ER 165 with AN: 10.0) is melted with slow stirring in a glass vessel at a temperature of around 120° C. Nonionic surfactant (additive E) and anionic surfactant (additive F) are dissolved in a solvent (e.g., 1,2-propylene glycol) at 90° C. in a second vessel and the solution is admixed with KOH.

The emulsifier mixture formed is stirred into the wax melt at approximately 100-120° C. with thorough stirring. The resulting melt is poured slowly into the pigment dispersion (a), which has been brought to about 90° C., and the mixture is stirred further at this temperature for a short time. Subsequently the further additives (e.g., preservative) are added.

(c) Polymerization with Monomer B:

Water, anionic surfactant (neutralized), and 15% of the monomer mixture B1 are charged to a reactor and heated to about 75° C. Ammonium peroxodisulfate is dissolved in demineralized water and added to the reaction mixture. The mixture is heated to 80° C. Following the onset of the reaction, the remaining monomer mixture B1 is metered into the reactor over 1 h. Thereafter, over 30 to 45 min, the wax-coated pigment dispersion from (b) is incorporated at a temperature above 78° C. Subsequently, monomer mixture B2 is metered at 80° C. and the mixture is stirred at this temperature for 2 h. Unreacted monomer is removed by distillation and the reaction mixture is cooled to below 35° C. Ascorbic acid and $H_2O_2$ are added, the mixture is stirred for 30 min, preservative is added, and the pH is adjusted to 7 by addition of KOH. This is followed by filtration through a 50 pm filter.

Examples 1 to 5 a) Preparation of a PY 155 Pigment Dispersion:

| C.I. Pigment Yellow 155 | 20 |
| Nonionic surfactant | 10 |
| Anionic surfactant | 2 |
| ® Mergal K7 | 0.1 |
| ® Mergal K10N | 0.1 |
| 1,2-Propylene glycol | 10 |
| Water | 57.8 | b) Preparation of a Wax-coated PY 155 Pigment Dispersion:

| ® Licomont ER 165 | 240 |
| Anionic surfactant | 16 |
| Nonionic surfactant | 34 |
| KOH, 43% strength | 10 |
| Water | 300 |
| Pigment dispersion from (a) | 1800 |

| | Coating % | Pigment % | Emulsifier % | Type | TSC % |
|---|---|---|---|---|---|
| Example 1: | 10 | 15 | 2.3 | 1 | 28 |
| Example 2: | 10 | 15 | 2.3 | 1 | 28 |
| Example 3: | 10 | 15 | 2.3 | 4 | 28 |
| Example 4: | 10 | 15 | 2.3 | 3 | 28 |
| Example 5: | 7 | 15.6 | 1.4 | 2 | 25 |

Emulsifier: nonionic+anionic surfactant

Nonionic surfactant: ®Genapol T 110,

Anionic surfactant: Genapol LRO (Type 1),

®Dispersogen LFES (Type 2),

Dispersogen LFH (Type 3),

Dispersogen T 160 (Type 4).

Genapol and Dispersogen are Clariant trademarks.

®Licomont ER 165=pentaerythritol 2,5-montanate acrylate (Licomont is a Clariant trademark);

TSC=total solids content.

(c) Preparation of a Polymer Dispersion:

| | |
|---|---|
| Wax-coated pigment dispersion PY 155 from (b): | 450 |
| Dispersogen LFH 28% strength | 12.5 |
| Monomer B1 | 20 |
| Monomer B2 | 10 |
| Ammonium peroxodisulfate | 0.95 |
| Ascorbic acid | 0.7 |
| Water | 400 |
| $H_2O_2$, 35% strength | 3.5 |
| Preservative | 0.3 |

Monomer B1: methyl methacrylate 9.4, ethyl acrylate 9.4, methacrylic acid 1.2
Monomer B2: methyl methacrylate 5, ethyl acrylate 5
Solids content: 14-15%; pigment content: 7-8%; MFT about 25.

Examples 6 and 7 a) Preparation of a Pigment Red 122 Pigment Dispersion:

| | |
|---|---|
| C.I. Pigment Red 122 | 20 |
| Nonionic surfactant | 10 |
| Anionic surfactant | 2 |
| Mergal K7 | 0.1 |
| Mergal K10N | 0.1 |
| 1,2-Propylene glycol | 10 |
| Water | 57.8 | b) Preparation of a Wax-coated PR 122 Pigment Dispersion:

| | |
|---|---|
| Licomont ER 165 | 240 |
| Anionic surfactant | 16 |
| Nonionic surfactant | 34 |
| KOH 43% strength | 10 |
| Water | 300 |
| Pigment dispersion from (a): | 1800 |

| | Coating % | Pigment % | Emulsifier % | Type | TSC % |
|---|---|---|---|---|---|
| Example 6: | 10 | 15 | 2.3 | 1 | 30 |
| Example 7: | 10 | 15 | 2.3 | 4 | 30 |

Nonionic surfactant: Genapol T 110;
Anionic surfactant: Genapol LRO (Type 1),
  Dispersogen T 160 (Type 4).
(c) Preparation of a Polymer Dispersion:

| | |
|---|---|
| Wax-coated pigment dispersion PR 122: | 450 |
| Dispersogen LFH 28% strength | 12.5 |
| Monomer B1 | 40 |
| Monomer B2 | 20 |
| Ammonium peroxodisulfate | 0.83 |
| Ascorbic acid | 0.7 |
| Water | 400 |
| $H_2O_2$, 35% strength | 3.5 |
| Preservative | 0.3 |

Monomer B1: methyl methacrylate 19.2, ethyl acrylate 18.8, methacrylic acid 2
Monomer B2: methyl methacrylate 9.9, ethyl acrylate 10.1
Solids content: 18-19%; pigment content: 7-8%; MFT about 25.

Example 8

(a) Preparation of a Pigment Blue 15:3 Pigment Dispersion:

| | |
|---|---|
| C.I. Pigment Blue 15:3 | 20 |
| Nonionic surfactant | 10 |
| Anionic surfactant | 2 |
| Mergal K7 | 0.1 |
| Mergal K10N | 0.1 |
| 1,2-Propylene glycol | 10 |
| Water | 57.8 |

(b) Preparation of a Wax-coated PB 15:3 Pigment Dispersion:

| | |
|---|---|
| Licomont ER 165 | 240 |
| Anionic surfactant | 16 |
| Nonionic surfactant | 34 |
| KOH 43% strength | 10 |
| Water | 300 |
| Pigment dispersion from (a) | 1800 |

Coating: 10%; pigment: 15%; emulsifier, type (1): 2.3%.
(c) Preparation of a Polymer Dispersion:

| | |
|---|---|
| Wax-coated pigment dispersion PB 15:3: | 450 |
| Dispersogen LFES, 28% strength | 25 |
| Monomer B1 | 40 |
| Monomer B2 | 70 |
| Ammonium peroxodisulfate | 0.83 |
| Ascorbic acid | 0.7 |
| Water | 413 |
| $H_2O_2$, 35% strength | 3.5 |
| Preservative | 0.3 |

Monomer B1: methyl methacrylate 19.2, ethyl acrylate 5.2, methacrylic acid 2.0
Monomer B2: methyl methacrylate 34.65, ethyl acrylate 35.35
Solids content: 22-23%; pigment content 6-7%; MFT about 22.

Example 9

(a) Preparation of a Pigment Black 7 Pigment Dispersion

| | |
|---|---|
| C.I. Pigment Black 7 | 20 |
| Nonionic surfactant | 10 |
| Anionic surfactant | 2 |
| Mergal K7 | 0.1 |
| Mergal K10N | 0.1 |
| 1,2-Propylene glycol | 10 |
| Water | 57.8 |

(b) Preparation of a Wax-coated Pigment Black 7 Pigment Dispersion:

| | |
|---|---|
| Licomont ER 165 | 240 |
| Anionic surfactant | 16 |
| Nonionic surfactant | 34 |
| KOH 43% strength | 10 |
| Water | 300 |
| Pigment dispersion from (a) | 1800 |

Coating: 10%; pigment: 15%; emulsifier, type (1): 2.3%.

(c) Preparation of a Polymer Dispersion:

| | |
|---|---|
| Wax-coated pigment dispersion PB 7: | 450 |
| Dispersogen LFH, 28% strength | 6.4 |
| Monomer B1 | 15.4 |
| Monomer B2 | — |
| Ammonium peroxodisulfate | 0.60 |
| Ascorbic acid | 0.7 |
| Water | 413 |
| $H_2O_2$, 35% strength | 3.5 |
| Preservative | 0.3 |

Monomer B1: methyl methacrylate 8.95, butyl acrylate 5.2, methacrylic acid 1.25

Solids content: 10-11%; pigment content 6-7%.

Example 10

PY 155

A portion of the monomers B is included in the wax coating. The amount of monomer used here is then no longer added in the subsequent polymerization.

| | |
|---|---|
| ® Licomont ER 165 | 105 |
| Anionic surfactant | 6.6 |
| Nonionic surfactant | 14 |
| KOH 43% strength | 2.9 |
| Methyl methacrylate | 42.7 |
| Water | 250 |
| Pigment dispersion from Example 1(a) | 1576 |
| Preservative | 2.1 |

Steps (b) and (c) take place in the same way as in Example 1.

Example 11

Pigment Black 7

A portion of the monomers B is included in the wax coating. The amount of monomer used here is then no longer added in the subsequent polymerization.

| | |
|---|---|
| ® Licomont ER 165 | 50.12 |
| Anionic surfactant | 3.12 |
| Nonionic surfactant | 6.67 |
| KOH 43% strength | 1.4 |
| Methyl methacrylate | 10.15 |
| Butyl acrylate | 10.15 |
| Water | 119 |
| Pigment dispersion from Example 1(a) | 1576 |
| Preservative | 1.2 |

Steps (b) and (c) take place in the same way as in Example 9.

General procedure for Examples 12 to 19 (process 2):

(a) Preparation of a Pigment Dispersion:

Analogous to the procedure described in process 1.

(b) Preparation of a Miniemulsion:

To prepare a wax miniemulsion, the polymerizable wax D in melted form is stirred into an aqueous solution of the nonionic and anionic surfactants above the melting temperature of the wax D, and dispersed if appropriate, forming an oil-in-water emulsion.

(c) Preparation of a Wax-Coated Pigment Dispersion:

The miniemulsion prepared in (b) is admixed with remaining nonionic and anionic surfactant, and the pigment dispersion prepared in (a) is metered in. A milling or dispersing assembly is used to grind the wax onto the pigment particles.

(d) Preparation of a Polymer Dispersion:

Analogous to the procedure described in process 1.

The polymer dispersions described in Examples 1 to 8 were prepared by the procedure of process 2: Examples 12 to 19.

Use Examples:

(A) Printing Inks:

The polymer dispersions of the invention and also, for comparison, the corresponding standard dispersions (steps a above) were incorporated into printing inks. Only in the case of the polymer dispersions of the invention was it possible to prevent the ink striking through the paper. The resulting image was glossy and water-resistant. Images with the standard dispersions were not water-resistant and showed virtually no gloss.

(B) Liquid Varnishes and Emulsion Paints:

The polymer dispersions of the invention and also, for comparison, the corresponding standard dispersions (a) were incorporated into varnishes and emulsion paints. The paint coating with the polymer dispersions of the invention was substantially more water-resistant than with the standard dispersions.

(C) Powder Coating Materials:

The polymer dispersions of the invention and also, for comparison, the corresponding standard dispersions (a) were spray dried and incorporated into powder coating materials.

In the case of the inventive powder coating materials, the color yield was higher and the chemical fixing in the matrix after baking was substantially better than in the case of the standard powder coating materials.

The invention claimed is:

1. Colored polymer particles comprising 5% to 95% by weight of at least one pigment and a polymerized coating prepared by polymerizing 2.5% to 50% by weight of a polymerizable wax D, in which the polymerizable function is an ethylenically unsaturated group, with 2.5% to 50% by weight of a monomer B having a functional group which reacts with the ethylenically unsaturated group of D, the weight percentages being based in each case on the total weight of the coated pigment particles, and the sum of the weight percentages not exceeding 100% by weight, wherein the polymerizable wax D is a reaction product of a polyol, long-chain aliphatic carboxylic acids, and at least one ethylenically unsaturated carboxylic acid, and optionally, oligomerized by the addition of a dicarboxylic acid.

2. A process for producing colored polymer particles as claimed in claim 1, comprising the step of freeing a colored polymer dispersion from solvents and subjecting the polymer dispersion to drying, wherein the colored polymer dispersion comprises as essential constituents (a) a color polymer prepared by polymerizing monomer A with monomer B, wherein monomer A is a pigment P coated with a polymerizable wax D and wherein the polymerizable function is an ethylenically unsaturated group, and monomer B being an ethylenically unsaturated compound;
(b) at least one nonionic surface-active additive E based on polyethers, polyglycerols or a mixture thereof;
(c) at least one anionic surface-active additive F based on sulfonates, sulfates, phosphonates, phosphates or carboxylates;
(d) water.

3. A composition colored by the polymer particles as claimed in claim 1, wherein the composition is selected from the group consisting of ink-jet inks, powder coating materials, UV-curing varnishes, electrophotographic toners, and electrophotographic developers.

* * * * *